United States Patent [19]

Shirai

[11] Patent Number: 4,687,200

[45] Date of Patent: Aug. 18, 1987

[54] MULTI-DIRECTIONAL SWITCH

[75] Inventor: Ichiro Shirai, Kyoto, Japan

[73] Assignee: Nintendo Co., Ltd., Kyoto, Japan

[21] Appl. No.: 764,514

[22] Filed: Aug. 9, 1985

Related U.S. Application Data

[63] Continuation of Ser. No. 521,116, Aug. 5, 1983, abandoned.

[51] Int. Cl.[4] .............................................. H01H 25/00
[52] U.S. Cl. ................................ 273/148 B; 273/1 E;
200/5 A; 200/339
[58] Field of Search ................... 200/5 A, 6 A, 159 A,
200/159 B, 339, 340, 241; 273/85 G, 148 B

[56]  References Cited

U.S. PATENT DOCUMENTS

| | | |
|---|---|---|
| 3,005,055 | 10/1961 | Mattke . |
| 3,852,557 | 12/1974 | Brown ................................. 200/339 |
| 3,996,427 | 12/1976 | Kaminski . |
| 4,018,999 | 4/1977 | Robinson et al. ................... 200/306 |
| 4,029,915 | 6/1977 | Ojima . |
| 4,124,787 | 11/1978 | Aamoth et al. . |
| 4,246,452 | 11/1981 | Chandler ............................ 200/6 A |
| 4,256,931 | 3/1981 | Palisek . |
| 4,341,383 | 7/1982 | Reichert ............................ 273/85 G |
| 4,355,483 | 10/1982 | Korzelius ......................... 200/159 B |
| 4,395,134 | 7/1983 | Luce . |
| 4,408,103 | 10/1983 | Smith, III . |
| 4,428,649 | 1/1984 | Main et al. ......................... 200/6 A |
| 4,490,587 | 12/1984 | Miller et al. ..................... 200/159 B |

OTHER PUBLICATIONS

Digital Joystick Switch, vol. 21, No. 12, May 1979, IBM Technical Disclosure Bulletin.

Primary Examiner—Richard C. Pinkham
Assistant Examiner—MaryAnn Stoll Lastova
Attorney, Agent, or Firm—Christensen, O'Connor, Johnson & Kindness

[57]  ABSTRACT

A four-directional switch which can be turned on and off in four directions, which comprises a base plate having a plurality of electrodes formed thereon, a key top having an indication showing predetermined four pressing directions in an identifiable manner, a support member constituting a fulcrum between the base plate and the key top, a plurality of conductive rubbers disposed opposing to the plurality of electrodes so as to be in electrical contact with corresponding ones of the electrodes, and a sustaining member having the plurality of conductive rubbers fixed thereto and having elastic force for sustaining the conductive rubbers so as not to be in contact with the electrodes when the key top is not pressed.

11 Claims, 7 Drawing Figures

MULTI-DIRECTIONAL SWITCH

This application is a continuation application based on prior copending Application Ser. No. 521,116, filed Aug. 5, 1983, now abandoned.

BACKGROUND OF THE INVENTION

1. Field of the Invention

The present invention relates to a multi-directional switch, and particularly relates to, for example, a multi-directional switch in which on-off operation of multiple contacts is dependent on the pressing directions of the switch.

2. Description of the Prior Art

FIG. 1 is a perspective view showing an example of a hand-held type game playing apparatus using a conventional character moving switch which constitutes the background of the present invention. Referring to FIG. 1, a body 1 comprises a liquid crystal display plate 2. The liquid crystal plate 2 comprises a plurality of characters formed with transparent electrodes so that a predetermined character is displayed according to development of a game or in response to operation of character moving switches 4a to 4d. The characters 3a, 3b, 3c and 3d illustrated in the drawing are selectively displayed by operation of character moving switches 4a, 4b, 4c and 4d. More particularly, the character 3a is displayed responsive to operation of the character moving switch 4a, the character 3b is displayed responsive to operation of the character moving switch 4b, the character 3c is displayed responsive to operation of the character moving switch 4c and the character 3d is displayed responsive to operation of the character moving switch 4d. Accordingly, by operating optionally the character moving switches 4a to 4d, a display is made as if characters 3a to 3d were moving. The body 1 further comprises game switches 5 and 6 for giving instructions to start a game of different difficulty and a current time switch 7 for giving instructions to indicate the current time.

As described above, the conventional character moving switches 4a to 4d are provided corresponding to the characters 3a to 3d, that is, corresponding to the moving directions of the characters. The character moving switches 4a and 4b are provided in the vicinity of the left end of the body 1, and the character moving switches 4c and 4d are provided in the vicinity of the right end of the body 1. Accordingly, if one plays a game with a hand-held type game playing apparatus in his hands, the character moving switches 4a and 4b must be operated with the left hand, and the character moving switches 4c and 4d must be operated with the right hand. Thus, it is very difficult to operate two switches with one hand and other two switches with the other hand. As a result, one must take a great care in operation of the character moving switches 4a and 4d, which makes the game dull. On the other hand, if a larger number of character moving switches are provided to increase character moving directions, more variety will be given to the game, so that one will not easily get bored with it. Thus, in using conventional character moving switches, there is a disadvantage that either variety of a game or simplicity in operation must be disregarded.

In order to eliminate the above described disadvantage, the character moving switches 4a to 4d might be disposed collectively in a certain position in the body 1 so that one can operate them with one hand. However, such collective disposition will encounter another problem in that two or more than two character moving switches are often pressed simultaneously. Conversely, this means that the character moving switches 4a to 4d must be separated from each other with a certain distance. Accordingly, space for positioning the character moving switches 4a to 4d should be made larger, and consequently sufficient space cannot be provided for display of the liquid crystal display plate 2. As a result, the content of a game organized in the liquid crystal display plate 2 has to be limited.

In the foregoing, the disadvantage of character moving switches used in a hand-held type game playing apparatus was explained. However, the same disadvantages or problems as described above are also found in various conventional apparatus where control for selection of modes or moving directions is made by means of switches, if switches are provided corresponding to the modes or moving directions.

SUMMARY OF THE INVENTION

Therefore, a primary object of the present invention is to provide a multi-directional switch which can be operated with efficiency in a simplified manner and does not occupy much space for fixing.

The present invention, briefly, has a distinctive feature in that a plurality of conductive members are disposed to be opposed to a plurality of electrodes formed on a base plate and, by pressing in either direction a key top having predetermined multiple pressing directions provided in an identified manner, a corresponding conductive member is brought into contact with associated electrodes, and thus the pressing direction of the key top serves as an important factor.

In accordance with the present invention, switching on and off of multiple contacts composed of a plurality of electrodes formed on a base plate can be performed with one hand and as a result, operation can be made much more easily as compared with conventional apparatus. Furthermore, since only a single key top is provided, it takes up little space for fixing.

These object and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
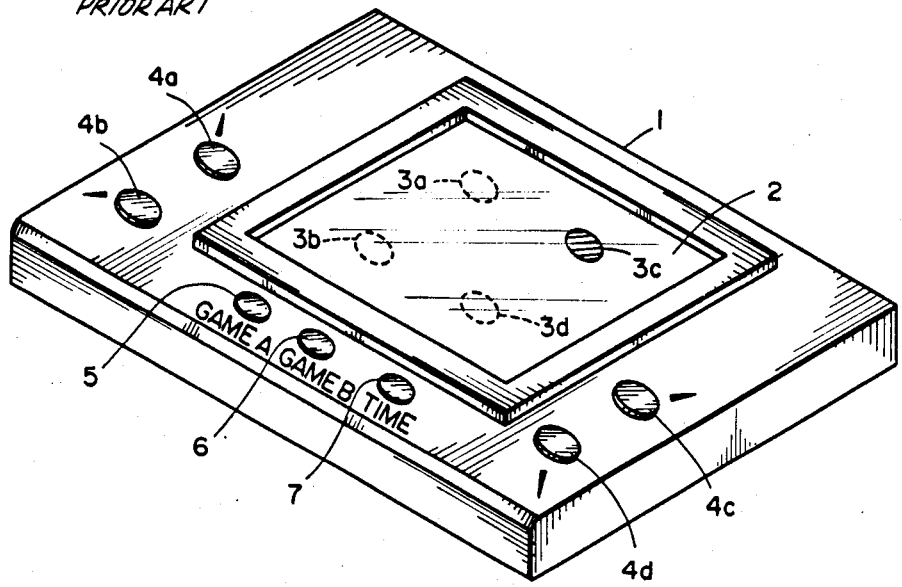
FIG. 1 is a perspective view showing an example of a hand-held type game playing apparatus using conventional character moving switches which constitute the background of the present invention.
Figure 2:
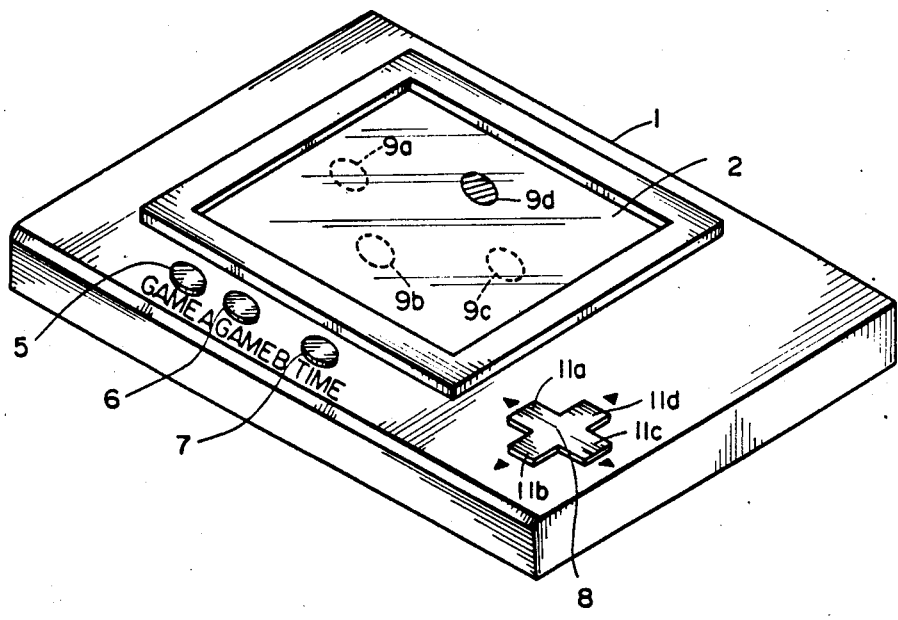
FIG. 2 is a perspective view showing an example of a hand-held type game playing apparatus using a character moving switch in which the present invention is embodied.

FIG. 2 is a perspective view showing an example of a hand-held type game playing apparatus using a character moving switch in which the present invention is embodied. Referring to FIG. 2, the hand-held type game playing apparatus is the same as the apparatus shown in FIG. 1, except the below described points. Therefore, the same reference numerals denote the like components, and the description of the same is omitted. A body 1 is provided with a character moving switch 8 which is an embodiment of the present invention. The character moving switch 8 is formed in the shape of a cross and is adapted such that characters 9a to 9d are selectively displayed responsive to the pressing direction in which the switch is pressed. More particularly, if a protrusion 11a is pressed, the character 9a is displayed; if a protrusion 11b is pressed, the character 9b is displayed; if a protrusion 11c is pressed, the character 9c is displayed, and if a protrusion 11d is pressed, the character 9d is displayed.

Figure 3:
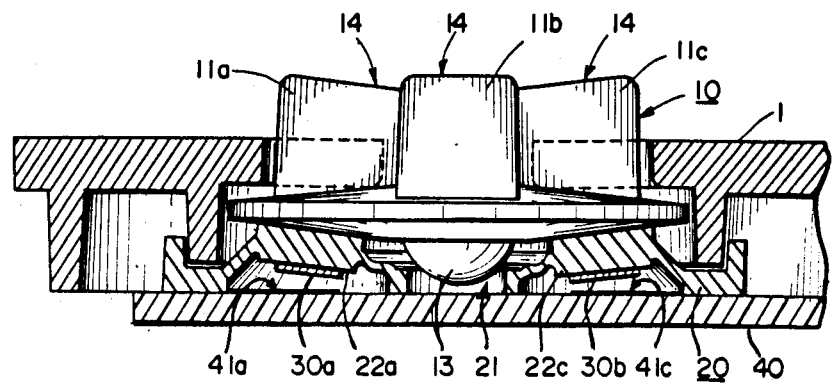
FIG. 3 is a sectional view showing installation of a character moving switch 8.
Figure 4:
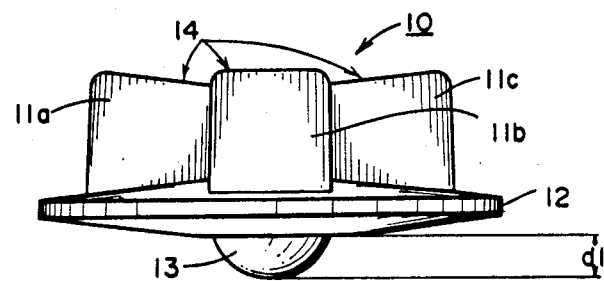
FIG. 4 is a front view showing a key top 10.
Figure 5A:
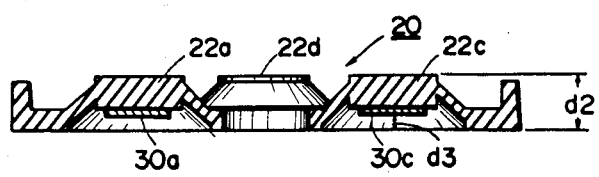
FIG. 5A is a sectional view of a sustaining member 20.
Figure 5B:
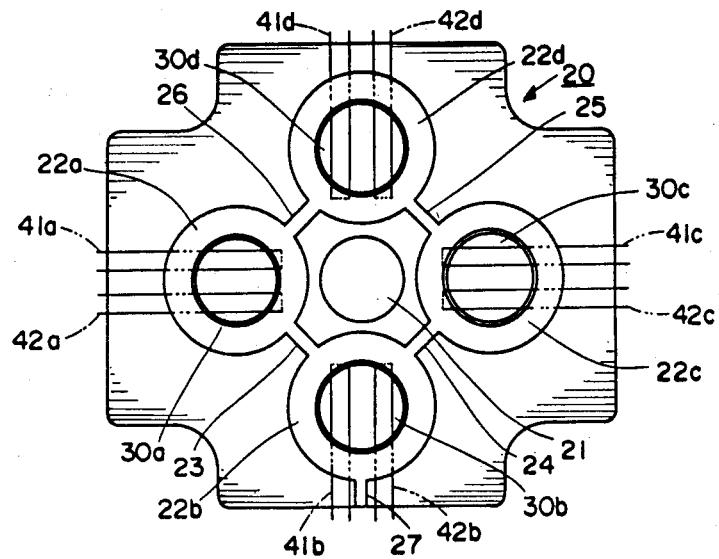
FIG. 5B is a bottom view of a sustaining member 20.

FIG. 3 is a sectional view showing installation of a character moving switch 8. Referring to FIG. 3, the components, except a key top 10 are sectionally illustrated. FIG. 4 is a front view showing a key top 10. FIG. 5A is a sectional view of a sustaining member 20. FIG. 5B is a bottom view of a sustaining member 20. In the following, a detailed description will be made of the structure of a character moving switch 8 with reference to FIGS. 2 to 5.

A character moving switch 8 is composed of a key top 10, a sustaining member 20 and a base plate 40. First, the formation of a key top 10 will be described. The key top 10 comprises a disk 12 having protrusions 11a to 11d in the shape of a cross formed on one surface thereof. An opening is formed in the body 1, so that the protrusions 11a to 11d in the shape of a cross may fit into it. The key top 10 is inserted into the opening from the inside of the body 1. As a result, the protrusions 11a to 11d in the shape of a cross are exposed outside the body 1, while the disk 12 is retained by the opening portion in the body 1 so that the key top 10 may not come off. An operational surface 14 of the protrusions 11a to 11d in the shape of a cross is formed with inclinations so as to become concave in the center. With these inclinations, the operational surface 14 is fitted perfectly for the touch of the fingers, which makes operations easier. On the other hand, on the other surface of the disk 12, a hemispherical supporting member 13 is fixed. A base plate 40 is disposed opposite to the other surface of the disk 12. Accordingly, the key top 10, pressed in either direction, is inclined to the pressing direction with a contact between the support member 13 and the base plate 40 serving as a fulcrum. Such a support member 13 may be provided in the base plate 40. The disk 12 is formed such that the thickness in the center is larger than that in the periphery. Accordingly, as shown in FIG. 3, when the key top 10 is not pressed, the other surface of the disk 12 has a certain angle of inclination with respect to the base plate 40. When any one of protrusion of the key top 10 is pressed, a corresponding portion on the other surface of the disk 12 under the pressed protrusion becomes approximately parallel to the base plate 40. As a result, any one of conductive rubbers 30a to 30d as to be described below can be in contact with the corresponding one of the electrodes 41a to 41d, and 42a to 42d in a parallel state, which serves to establish a good contact between a conductive rubber and corresponding electrode.

Next, a sustaining member 20 will be described. A sustaining member 20 is made of elastic material such as rubber and is disposed between the other surface of the disk 12 and the base plate 40. In a central portion of the sustaining member 20, an opening 21 is formed, into which the support member 13 is inserted. Four sustainers 22a, 22b, 22c and 22d are formed so as to surround the opening 21. The sustainers 22a to 22d are disposed respectively under the protrusions 11a to 11d. When the sustaining member 20 is placed on the base plate 40, the sustainers 22a to 22d form a cavity between them and the base plate 40. Conductive rubbers 30a, 30b, 30c and 30d are attached to the upper inner surfaces of the cavity of the sustainers 22a, 22b, 22c and 22d, respectively. Grooves 23 to 26 are formed between the sustainers 22a to 22d. In addition, a groove 27 is formed from the sustainer 22b to the outer side. These grooves 23 to 27 serve for ventilation and prevent the sustaining member 20 from being held adhering to the base plate 40 when the sustaining member 20 is pressed, so that the sustaining member 20 can return to its original state.

Now, description will be made of the formation of the base plate 40. Electrodes to be turned on and off by operation of the key top 10 is formed on the base plate 40. More particularly, as shown in FIG. 5B, electrodes 41a and 42a are formed opposing to the conductive rubber 30a. In the same manner, electrodes 41b and 42b are formed opposing to the conductive rubber 30b; electrodes 41c and 42c are formed opposing to the conductive rubber 30c; and electrodes 41d and 42d are formed opposing to the conductive rubber 30d.

Operation in a state where the above described key top 10, sustaining member 20 and base plate 40 are incorporated in the body 1 will be described in the following. First, description is made of a case where the key top 10 is not pressed. In this case, the sustaining member 20 pushes up the under surface of the disk 12 by its elastic force so that the upper surface of the disk 12 is pressed against the body 1.

When the key top 10 is pressed, the support member is brought into contact with the base plate 40 to form a fulcrum. In this case, even if the central portion of the key top 10 is pressed vertically downward, neither of the conductive rubbers 30a to 30d will be in contact with the corresponding electrodes. Furthermore, even if two or more than two protrusions are simultaneously pressed by mistake, two or more than two conductive rubbers will not be simultaneously brought into contact with the corresponding electrodes. For this purpose, a height d1 of the support member 13, a height d2 of the sustaining member 20 and a height (stroke) d3 from the bottom of the containing member 20 to the conductive rubbers 30a to 30d are determined.

When any one of the protrusions 11a to 11d of the key top 10 is pressed, the disk 12 is inclined to the pressing direction with fulcrum formed by the support member 13 as a center. For example, assuming that the protrusion 11d is pressed, the sustainer 22d under the protrusion 11d is pushed down toward the base plate 40 against its elastic force. Consequently, the conductive rubber 30d is also pushed down so as to be in contact with the electrodes 41d and 42d. As a result, the electrodes 41d and 42d are short-circuited to turn on a predetermined circuit, not shown in the drawings. In response thereto, a segment 9d is displayed. Also, when any of other protrusions 11a, 11b and 11c is pressed, almost the same operation as described above is performed.

Figure 6:
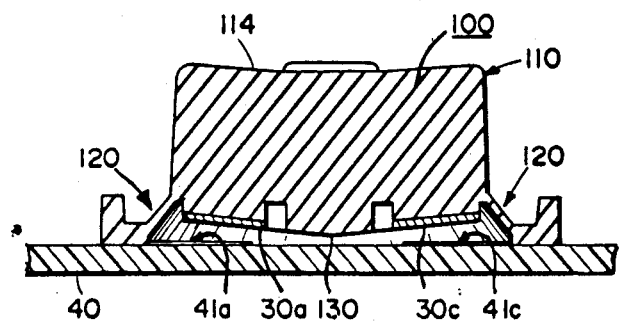
FIG. 6 is a sectional view showing another embodiment of the present invention.

FIG. 6 is a sectional view showing another embodiment of the present invention. The embodiment shown in FIG. 6 has the same structure as that in the embodiment shown in FIGS. 2 to 5B, except for the below described points, and like components are denoted by the same reference numerals, while the description thereof is omitted. The embodiment in FIG. 6 is characterized in that a key top 10 and a sustaining member 20 is the embodiment shown in FIGS. 2 to 5B are integrally formed as a unitary structure. More particularly, a key top 100 is made of elastic material such as rubber and includes an operational portion 110 corresponding to the key top 10 of the above described embodiment and a conductive rubber sustaining portion 120 corresponding to the sustaining member 20 of the above described embodiment. In the bottom of the operational portion 110, that is, the upper inner surfaces of the conductive rubber sustaining portions 120, four conductive rubbers 30a to 30d are attached in the same manner as in the embodiment described above. In the central portion, a support portion 130 corresponding to the support member 13 of the above described embodiment is formed. In addition, an operational surface 114 of the operational portion 110 is formed to become concave in the center for the purpose of facilitating the operation as in the operational surface 14 of the key top in the above described embodiment. The upper inner surface of the conductive rubber sustaining portion 120 has a certain angle of inclination with respect to the base plate 40 so that a good contact can be established between the conductive rubbers 30a to 30d and the corresponding electrodes.

The above described embodiments were adapted such that, if two or more than two conductive rubbers are simultaneously in contact with the corresponding electrodes, such will be deemed a malfunction. However, an embodiment may be such that a case where two conductive rubbers are simultaneously in contact with the corresponding electrodes may be adopted as a normal operation so that the pressing direction can be identified by combination of the two contacts being turned on. In such a case, while the conductive rubbers 30a to 30d, and the electrodes 41a to 41d and 42a to 42d, for example, are disposed in the same positions as in the above described embodiments, the shape of a cross of the key top 10 or 110 has to be turned by an angle of 45°.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A multi-directional switch which can be manually actuated in multiple directions by a depressing action with the tip of a finger of an operator, said multi-directional switch comprising:
    (a) a base member;
    (b) an integral key member disposed above said base member, said key member including a plate portion and a manipulation portion extending upwardly from said plate portion, said manipulation portion having a downwardly concave upper surface for receiving a fingertip of the operator, said plate portion having a generally planar bottom surface that is sloped upwardly relative to said base member in the direction extending radially outwardly from a central portion of said bottom surface;
    (c) a plurality of electrodes disposed on said base member, said electrodes having generally planar contact surfaces;
    (d) a deformable sustaining member composed of flexible, resilient material, said sustaining member:
        (i) underlying the bottom surface of and upwardly supporting said key member and,
        (ii) overlying and nominally spaced above said base member;
    (e) a plurality of electrically conductive members having generally planar contact surfaces, said electrically conductive members mounted on said sustaining member and carried by said sustaining member at locations above a corresponding electrode;
    (f) a support member extending downwardly from a central portion of the lower surface of said key member, said support member integrally formed with said key member and constituting a fulcrum between said key member and said base member; and,
    (g) whereupon when said key member is depressed and tilted downwardly about said support member by use of a fingertip of the operator, the substantially planar bottom surface of said key member presents a generally planar bearing area against the adjacent region of said underlying sustaining member, thereby to temporarily deform said underlying sustaining member and simultaneously push a corresponding conductive member, being carried by said sustaining member, downwardly into face-to-face contact with its corresponding electrode.

2. The multi-directional switch according to claim 1, wherein said key member includes indicia located on the manipulation portion of said key member, said indicia corresponding to the particular conductive member that is placed in contact with its associated electrode when the corresponding portion of said key member on which said indicia is located is tilted downwardly about said support member.

3. The multi-directional switch according to claim 1, adapted for use in a hand-held type game apparatus having characters displayed on a display, wherein the game apparatus is played by controlling the movement of the characters about the display by tilting said key member downwardly at the portion of said key member corresponding to the desired direction of movement of the characters.

4. A multi-directional switch according to claim 1, wherein said multi-directional switch is housed within a casing, said casing having an opening formed therein for exposing the manipulation portion of said key member.

5. A multi-directional switch according to claim 1, wherein said region of said sustaining member corresponding to the locations of said conductive members press nominally upwardly against the bottom surface of said key member.

6. A multi-directional switch according to claim 1, wherein:
    the manipulation portion of said key member includes a plurality of protrusions extending outwardly from a central portion of said key member, each of said protrusions having an upper surface sloped upwardly along the length of said protrusion in the direction extending radially outwardly from the central portion of said key member; and said electrodes being disposed on said base members at locations corresponding to the locations of said protrusions whereby the tilting of said key member downwardly about said support member in the direction of a selective protrusion moves a corresponding conductive member, being supported by such sustaining member, into face-to-face contact with its corresponding electrode.

7. A multi-directional switch according to claim 6, wherein said conductive members are disposed beneath corresponding protrusions of said key members.

8. A multi-directional switch according to claim 6, including four protrusions, two of said protrusions extending in opposite directions from each other along a first transverse axis passing through the central portion of said key member and the other two of said protrusions extending in opposite directions from each other along a second transverse axis disposed substantially perpendicularly to said first axis and passing substantially through the central portion of said key member, said four protrusions thereby defining a cruciform shape.

9. In a hand-held game apparatus wherein a game is played by controlling the movement of characters displayed on a display of the game apparatus, a multi-directional switch for selectively controlling the movement of the characters in four orthogonally related directions about the display, comprising:

(a) a base member;
(b) an integral key member disposed above said base member, said key member:
  (i) including a plate portion and a plurality of protrusions each extending upwardly from said plate portion and outwardly from a central axis of said key member in four orthogonally related directions about said central axis corresponding to the directions of movement of the characters about the display;
  (ii) each of said protrusions having an upper surface that slopes upwardly along the length of said protrusion in the direction extending radially outwardly from the central axis of said key member; and,
  (iii) said plate portion having a generally planar bottom surface that is sloped upwardly relative to said base member in the direction radially outwardly from the central axis of said key member;
(c) a plurality of electrodes disposed on said base member at locations corresponding to the locations of the protrusions of said key member, said electrodes having generally planar contact surfaces;
(d) a deformable sustaining member composed of flexible, resilient material, said sustaining member:
  (i) underlying the bottom surface of and upwardly supporting said key member and,
  (ii) overlying and nominally spaced above said base member;
(e) a plurality of electrically conductive members having generally planar contact surfaces, said electrically conductive members mounted on and carried by said sustaining member at locations in registry with and spaced above a corresponding electrode;
(f) a support member extending downwardly along the central axis of said key member from the bottom surface of said key member, said support member integrally formed with said key member and constituting a fulcrum between said key member and said base member; and,
(g) whereupon when said key member is depressed by use of the tip of a finger of the operator to tilt said key member about said support member in the direction of a selective protrusion, the substantially planar bottom surface of said key member disposed beneath said protrusion pushes downwardly against the adjacent region of said sustaining member, thereby to temporarily deform said underlying sustaining member and simultaneously move a corresponding conductive member, being carried by said sustaining member, into face-to-face contact with its corresponding electrode.

10. The multi-directional switch according to claim 9, wherein said key member includes indicia on the protrusions of said key member corresponding to the direction of movement of the character when the particular protrusion of said key member on which said indicia is located is depressed.

11. The multi-directional switch according to claim 9, further comprising a casing for housing said key member, said base member and said sustaining member, said casing having an opening formed therein for access to the protrusions of said key member.

* * * * *